United States Patent Office 3,225,851
Patented Dec. 28, 1965

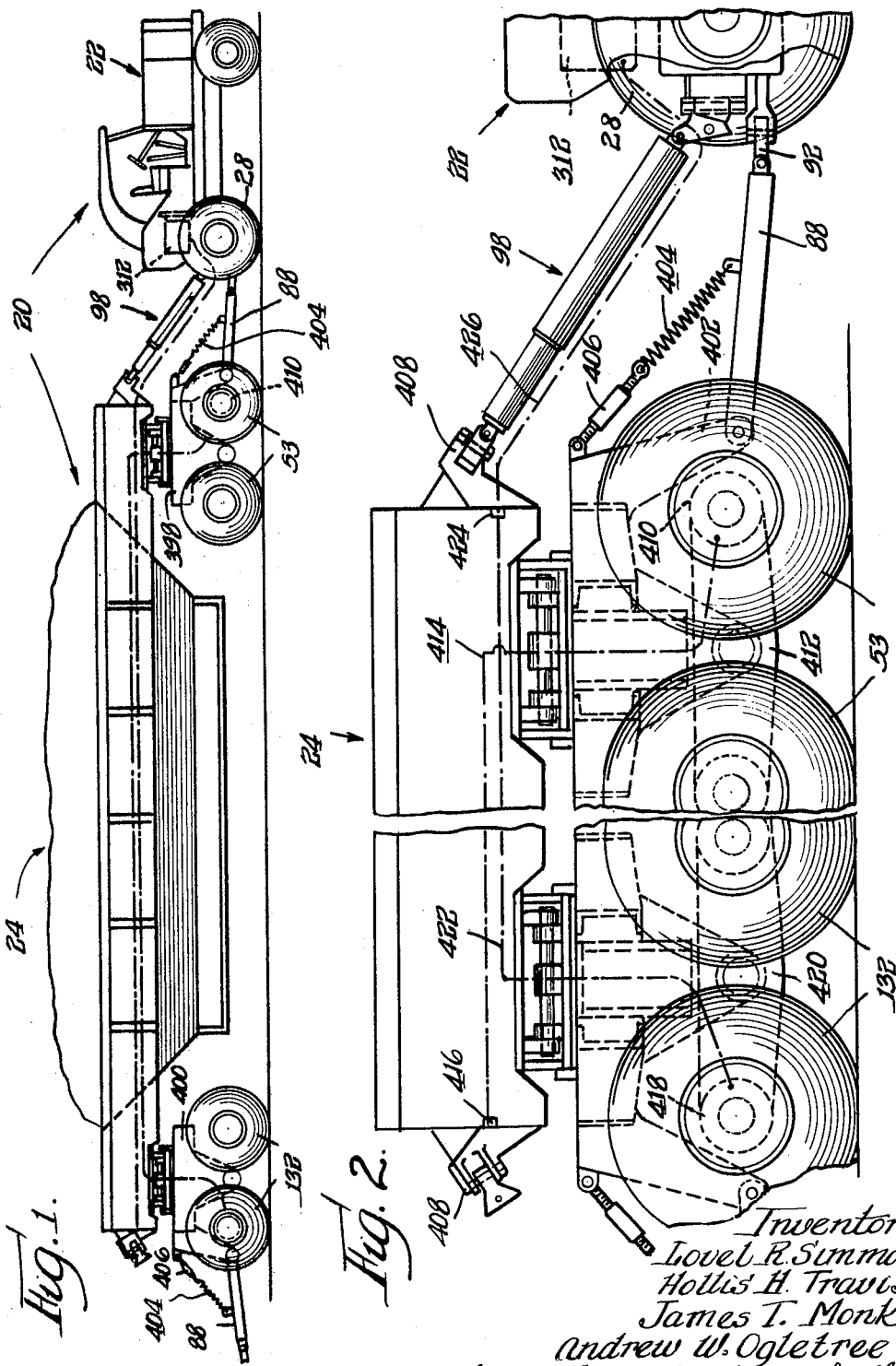

3,225,851
TRACTION FOR EARTH MOVERS AND THE LIKE
Lovel R. Simmons, Jackson, Miss., Hollis H. Travis, Dallas, Tex., and James T. Monk, Louisville, and Andrew W. Ogletree, Clinton, Miss., assignors to M-R-S Manufacturing Company, Flora, Miss., a corporation of Delaware
Original application May 27, 1960, Ser. No. 32,195. Divided and this application June 5, 1964, Ser. No. 372,966
4 Claims. (Cl. 180—14)

This invention is concerned with the movement of earth, coal and the like, and is particularly concerned with improved traction for earth movers.

The present application is a division of our application SN 32,195 filed May 27, 1960, for "Improved Traction for Earth Movers and the Like."

In order to move dirt and the like economically, it is necessary to carry very large loads. Although good highways or haul roads produce no particular problems, such loads must often be carried over terrain providing very poor traction, and often uphill over quite substantial grades, as from a borrow pit or from a coal mine. Frequently material which is inherently of poor traction is combined with uphill movement.

There are three recognized types of rubber tired earth movers, respectively having two axles, three axles, and four or more axles. Each such earth mover or unit includes a trailer or semi-trailer. In the case of a scraper, the trailer or semi-trailer further is provided with a blade or plate at the lower front end to scrape dirt or the like for hauling in a bowl or hopper immediately to the rear thereof.

The two axle unit comprises a tractor having a single axle, and a semi-trailer having a single axle at the rear end and supported at the front on the tractor. The semi-trailer generally has a gooseneck arrangement at the front in order to clear the wheels of the tractor when the tractor turns. This type of unit is relatively small and is of restricted load carrying capacity. Obviously, the trailer has no independent existence, nor does the tractor, and neither can be used independently of the other.

The three axle unit or earth mover is similar to the two axle unit, except that an additional axle is provided on the tractor for steering thereof. Again, the trailer has no independent existence and cannot be used without the tractor. Usually in either a two axle or a three axle unit only the rear axle of the tractor provides driving force.

In a four axle unit there is a two axle trailer which is connected to a two axle tractor through a draw-bar. The front axle of the trailer is steered by the drawbar. Either the tractor or the trailer has an independent existence, and is usable without the other. Most commonly, driving force is provided only by the rear wheels of the tractor. However, it is known that some of the wheels of a trailer can also be driven, either through appropriate mechanical or electrical connection to the tractor, or by means of an auxiliary engine on the trailer. One such machine and modifications thereof are shown in our parent application referred to herein above.

For traction purposes relatively soft tires that will flatten out under load are best when maximum traction is required, as on poor traction terrain, or on substantial uphill grades. However, low pressure traction tires are incompatible with high pay loads combined with high speeds. High pressure and high capacity are limited by commercially available tires available without special order, which enhances the value of having a multiplicity of tires, as is possible with a separate prime mover and load carrying vehicle for hauling the large loads desired for more economical operation.

It is neither difficult nor expensive to install an engine in an earth mover which develops more power than can be used at low speeds, traction being the limiting factor. Probably the best means heretofore available for securing improved traction on earth movers to utilize more of the available power is that known in the trade as "weight transfer." Such weight transfer is shown in many prior patents to L. R. Simmons, Simmons 2,459,098 being exemplary. In accordance with such a weight transfer system, an inclined or semi-vertical hydraulic actuator is mounted at the lower rear part of the tractor and at the upper front part of the trailer. When the actuator is extended, part of the load of the trailer is transferred from the front wheels of the trailer to the wheels of the tractor. The weight transfer can be to only the rear wheels, when only these wheels are driven, or it can be to all four wheels of the tractor, when all four wheels thereof are driven wheels. The latter arrangement is shown in Simmons 2,899,004. The increased weight on the wheels of the tractor gives much better traction, and enhanced load hauling ability. Part of the increase in traction is brought about by the increased force on the tires normal to the supporting surface, since friction is a factor of the co-efficient of friction and the normal force. In addition to this, the increased weight causes the tires to flatten out rather substantially, causing them to conform better to the surface of the terrain, and hence to provide a better grip thereon.

The weight transfer feature is generally used only at low speeds, and generally on poor traction terrain or on grades. Once a reasonable speed is obtained on a relatively good road, the weight transfer is abandoned by releasing the pressure in the hydraulic actuator. This avoids continued flattening of the drive wheels of the tractor which would result in rapid wear at high speed.

We have discovered that the combination of weight transfer plus power drive of one or more trailer axles in addition to the usual tractor drive provides a particularly desirable drive for the unit. The result of the combination is more than one might expect since there is not an arithmetic sum involved. In other words, one might assume that a certain improvement in horizontal force transmission between the vehicle and the ground would be obtained by weight transfer, and that a similar improvement in traction would be found upon providing power drive for one of the trailer axles. When both are used together, the total driving force is not a simple arithmetic sum of the two, but somewhat surprisingly, is somewhat more than ten percent greater than the simple sum.

Accordingly, it is an object of this invention to provide a machine for moving earth and the like having a combination of weight transfer and trailer drive. Various aspects of this combination are disclosed and claimed in our copending applications (Case 3A and Case 3B) both entitled "Improved Traction for Earth Movers and the Like," both filed on June 5, 1964, and respectively under Serial No. 374,882 and 372,936.

Specifically, it is an object of this invention to provide such a machine having electric drive of the trailer.

In some instances, as in coal mining, it is desirable to move a trailer into a restricted space or area from which it cannot be turned around for removal. Vehicles of the size involved are not well adapted to being backed up.

Accordingly, it is an object of this invention to provide a tractor-trailer combination wherein the trailer is double ended and can be towed with equal facility from either end by the tractor.

In particular, it is an object of the invention to provide a tractor-trailer earth mover or the like in which the trailer is longitudinally symmetrical.

Yet another object of this invention is to provide a tractor-trailer earth moving combination utilizing the combination of weight transfer and trailer drive which is effective with the tractor connector to either end of the trailer.

Other and further objects and advantages of the present invention will be apparent from the following description when taken in connection with the accompanying drawings wherein:

FIG. 1 is a side view of an earth or coal moving machine constructed in accordance with the principles of the present invention, and FIG. 2 is a fragmentary side view thereof illustrating certain details.

Referring now in greater particularity to the drawing, there is shown an earth moving machine designated generally by the numeral 20 and comprising a tractor 22 and a trailer 24. The trailer specifically comprises a trailer for hauling coal, although dirt or other substances also can be carried. The tractor is provided with a front axle having a pair of steerable pneumatic-tired wheels, and with a rear axle having a pair of pneumatic-tired drive wheels 28 thereon. The tractor, sometimes known as the prime mover, comprises the usual engine (not shown) from which the rear axle and tires 28 are driven in the usual manner as by a drive shaft and differential gears (not shown). The tractor further is provided with a driver's seat and the necessary operating controls, and with an electric generator 312 driven by a suitable drive means (not shown) from the engine.

The trailer is detachably connected at the front end thereof by means of the drawbar 88 to the rear end of the tractor. The drawbar may be of the straight through, or of the A-shaped type, and is connected to the tractor for pivoting movement up and down, and also from side to side, and is connected to the trailer for up or down pivoting. The drawbar steers the trailer, as is known.

In addition, the tractor is hitched to the trailer by means of a hydraulic actuator cylinder 98. This hydraulic actuator is connected to the tractor for up and down pivoting movement, and also for side to side pivoting movement, and is similarly connected to the trailer. A source of hydraulic fluid (not shown) driven by the tractor engine is provided, and is controlled by one of the controls at the operator's seat in the cab. When the hydraulic actuator 98 is extended, the drawbar 88 being inextensible, a vertical downward force is developed which transmits a portion of the weight of the front part of the trailer to the rear wheels of the tractor, thereby imparting better traction to the rear tires 28.

In certain respects, the trailer or coal hauler is conventional, being loaded from the top, and dumped from the bottom. The front wheels 23 are provided in tandem, mounted on a truck 398 turnable about a vertical axis beneath the front of the trailer. Similarly, the rear wheels 132 are mounted on a truck 400 which is pivotable about a vertical axis at the back of the trailer. It will be understood that reference to the front and rear end of the trailer is purely nominal, since the trailer is reversible and is longitudinally symmetrical. The trailer is provided at the front end with a hitch 402 for the drawbar 88 to allow pivoting about a horizontal axis. (Pivoting about a vertical axis is effected by turning of the entire truck 398 to steer the trailer.) A spring 404 is stretched between the drawbar and a turnbuckle or other adjustment device 406, whereby the drawbar will be raised above the ground when it is released from the coupling 92 to the tractor. A similar spring 404 and turnbuckle 406 are provided at the rear end of the trailer.

At a higher elevation on the front end of the trailer there is provided a coupling 408 for the weight transfer actuator, comprising a ram and cylinder 98. As will be understood, a similar mechanism 408 is provided at the rear end of the trailer. The foremost of each tandem pair of front wheels 53 is provided with an electric motor 410, and the rearmost of each tandem pair of front wheels is driven in synchronism therewith by a chain box 412. A cable 414 runs from the motors 410 to a separate connection 416 at the rear of the trailer. Thus, normally the front motors are not driven. Similarly, the rearmost of each tandem set of rear wheels 132 is provided with an electric motor 418. Correspondingly, the foremost of each tandem pair of rear wheels is driven by a chain in a chain box 420. A cable 422 extends from the motors 418 to a separable connection 424. A flexible cable 426 is detachably connected to the connection 424, and leads from the generator 312 of the tractor through suitable controls at the operator's station.

Thus, the rear wheels of the trailer are selectively driven. When the tractor has pulled the trailer, either with or without rear wheel drive of the trailer, into a desired loading position, the tractor readily is separated from the trailer simply by detaching the connections at 92 and at 408, along with the detachable electrical connection 424. The tractor is then driven around to the opposite end of the trailer. The detachable drawbar connection 92 associated with the drawbar 88 at the former nominally rear end of the tractor is connected as is the correspondingly transfer hydraulic actuator at 408, and the cable is plugged in at 416. The tractor and trailer are then driven away with the trailer moving in the reverse of the initial direction, and with the now rear wheels ready to drive as desired.

Thus, improved traction is obtained by the combination of weight transfer and trailer drive, and this is done in combination with longitudinal symmetry of the trailer to afford trailing from either end with a minimum of fuss in connecting or disconnecting the tractor. The connections automatically provide for driving whichever are functionally the rear wheels.

The specific example of the invention as herein set forth is for illustrative purposes only. Various changes in structure will no doubt occur to those skilled in the art, and will be understood as forming a part of the present invention insofar as they come within the spirit and scope of the appended claims.

The invention is claimed as follows:

1. A machine for moving earth and the like comprising a tractor having drive wheels, a source of electric power carried by said tractor, means providing an operator's station on said tractor, a trailer having left and right front and left and right rear wheels, power means on said trailer and comprising two electric motors respectively connected to said left and right rear wheels of said trailer to enable said trailer to develop a driving force, draft means interconnecting said trailer and said tractor for pulling of said trailer by said tractor, electric power transmission means between said tractor electric power source and said motors, means interconnecting the rear of said tractor and the front of said trailer and operative for transferring at least a part of the weight of said trailer from said front to said tractor rear wheels, control means at said operator's station on said tractor operatively connected to said weight transfer means and to said electric motors for selectively operating both thereof, and means for selectively driving the wheels at one end of said trailer or the other, said selective driving mans comprising said two electric motors for said left and right rear wheels respectively, and two additional electric motors for the left and right front wheels respectively, and means for selectively energizing said motors.

2. A machine as set forth in claim 1 wherein the trailer is longitudinally symmetrical and is connectable at either end to said tractor, said trailer including a drawbar connected thereto at each end, only one said drawbar being connected to the tractor at any given time, and further including spring means acting on each of said drawbars, and holding a drawbar not connected to the tractor above ground level.

3. A machine as set forth in claim 1 wherein the trailer is longitudinally symmetrical and is connectable at either end to said tractor, connection of either end to said tractor automatically determining which of said trailer front and rear wheels will be driven.

4. A machine as set forth in claim 1 and further including electric conductor means selectively connectable from said tractor to the adjacent end of said trailer automatically to determine which motors are to be operative.

References Cited by the Examiner

UNITED STATES PATENTS

| | | | |
|---|---|---|---|
| 1,874,604 | 8/1932 | Roche | 180—14 X |
| 2,406,944 | 9/1946 | Choate et al. | 180—14 X |
| 2,459,098 | 1/1949 | Simmons | 280—406 |

FOREIGN PATENTS

| | | |
|---|---|---|
| 49,471 | 8/1911 | Austria. |
| 168,153 | 4/1951 | Austria. |
| 236,467 | 7/1925 | Great Britain. |

BENJAMIN HERSH, *Primary Examiner.*

LEO FRIAGLIA, A. HARRY LEVY, *Examiners.*